United States Patent [19]

Bryant et al.

[11] Patent Number: 5,241,682
[45] Date of Patent: Aug. 31, 1993

[54] BORDER NODE HAVING ROUTING AND FUNCTIONAL CAPABILITY IN A FIRST NETWORK AND ONLY LOCAL ADDRESS CAPABILITY IN A SECOND NETWORK

[75] Inventors: David B. Bryant, Raleigh, N.C.; Mark A. Cossack; Dennis J. Frett, both of Rochester, Minn.; Harold A. Himwich; Lap T. Huynh, both of Raleigh, N.C.; John E. McGinn, Rochester, Minn.

[73] Assignee: International Business Machines Corporation, Armonk, N.Y.

[21] Appl. No.: 687,278

[22] Filed: Apr. 18, 1991

[51] Int. Cl.⁵ .................... G06F 13/00; G06F 13/14
[52] U.S. Cl. ........................ 395/800; 395/200; 370/85.13; 370/85.14; 364/940.64; 364/949.91; 364/949.92; 364/949.93; 364/949.94; 364/DIG. 2
[58] Field of Search .................. 395/800, 200; 370/85.13, 85.14

[56] References Cited

U.S. PATENT DOCUMENTS

| | | | |
|---|---|---|---|
| 4,287,592 | 9/1981 | Paulish et al. | 370/85.14 |
| 4,644,468 | 2/1987 | Doster et al. | 395/200 |
| 4,933,937 | 6/1990 | Konishi | 370/85.13 |
| 4,947,390 | 8/1990 | Sheehy | 370/85.13 |
| 5,018,137 | 5/1991 | Backes et al. | 370/85.13 |
| 5,027,350 | 6/1991 | Marshall | 370/85.13 |
| 5,031,174 | 7/1991 | Natsume | 370/85.5 |
| 5,088,090 | 2/1992 | Yacoby | 370/85.13 |

Primary Examiner—Thomas C. Lee
Assistant Examiner—Paul Harrity
Attorney, Agent, or Firm—Andrew J. Dillon

[57] ABSTRACT

A method and apparatus for interconnecting multiple data processing networks, each data processing network including: multiple network nodes having routing and functional capability within a data processing network; and, multiple endpoint nodes, each including only local address capability. Each network node may be connected to multiple endpoint nodes and other network nodes; however, connection is only permitted to network nodes within the same data processing network. A border node is established for interconnection between two data processing networks. The border node includes a network node interface having routing and functional capability within a first data processing network and an endpoint node interface having local address capability. When interconnected between the first data processing network and a network node within a second data processing network, the border node emulates a network node within the first data processing network while appearing as an endpoint node within the second data processing network, permitting full connectivity between the two networks. The border node then maintains routing information for communication between the two data processing networks in two segments. A first segment details the route between the first data processing network and the border node while a second segment details the route between the border node and a node within the second data processing network.

9 Claims, 4 Drawing Sheets

BORDER NODE HAVING ROUTING AND FUNCTIONAL CAPABILITY IN A FIRST NETWORK AND ONLY LOCAL ADDRESS CAPABILITY IN A SECOND NETWORK

CROSS-REFERENCE TO RELATED APPLICATION

This application is related to U.S. Pat. application Ser. No. 687,258, filed of even date herewith, entitled "METHOD AND APPARATUS FOR INTERCONNECTION OF LOCAL AREA NETWORKS WITH WIDE AREA NETWORKS," now pending and assigned to assignee herein.

BACKGROUND OF THE INVENTION

1. Technical Field:

The present invention relates in general to computer network communications and in particular to a method and apparatus for interconnecting multiple computer networks. Still more particularly, the present invention relates to a method and apparatus for interconnecting multiple computer networks while maintaining topological isolation between the networks.

2. Description of the Related Art:

Computer system networks continue to increase in popularity. That is, in large part, because such networks allow applications and users running on many different systems to communicate with each other, providing data and resource sharing. Networks may be limited to a desktop systems located in close physical proximity, or may include thousands of systems of all sizes connected in a worldwide network. In general, networks are flexible, so they may be adapted to suit the needs of their users.

One important type of computer network is referred to as a peer to peer network. With such a network topology each node of the network is considered to be equal with all other nodes. Each node may act as an intermediate node in a communications session, routing sessions between other network nodes. Such networks may also include terminal nodes, which are not required to transmit data between two separate, adjacent systems as part of a communications link between them. A communications session initiated by a node of the network is routed to the nearest node, which selects the routing to be used to the next node in a communications link. One example of such a powerful, flexible system is System Network Architecture (SNA), a network architecture defined by International Business Machines Corporation, and widely used throughout the world.

In a typical network, local networks, or subarea networks are often connected to the remainder of the network through a single, fully featured, network node. Such network nodes must have full routing and functional capability within the network, but terminal nodes, such as workstations, which are connected to a network node need not have such a capability. Even if only a few low end workstations in a single physical location are connected to a wide area network, a system capable of supporting full network node functions must typically be placed locally to allow such network access.

A full network node must be a relatively powerful system capable of supporting a wide variety of network functions. For example, an SNA network node must be capable of acting as an intermediate node in a session between two nodes which may be connected through a large number of additional intermediate nodes. The network node maintains a route selection table for many of the logical units in the network, and has the capability to search for and determine the location of any node within the network given its logical unit identifier. When a logical unit requests a session with another logical unit, a network node receiving such a request must locate the target logical unit, either in its route selection table, or by searching for it, and thereafter establish communication sessions with both the logical unit making the request and a companion session with another adjacent node. The other adjacent node may be the target logical unit, or it may be another intermediate node utilized to establish a link to the target logical unit.

Once a session has been set up between two logical units, the network node routes incoming data to the appropriate outgoing communications link. Various services are provided by the network node. These may include, for example, adaptive pacing of data, renegotiation of bind values, and similar services. The numerous functions required of a network node are well documented, and well known to those skilled in the art.

The complex functions and duties required of a network node give rise to a problem in the event it is desired to interconnect multiple peer-to-peer networks. The requirement that each network node within such a network have the ability to provide route selection, directory search processing and intermediate routing functions requires that each such network node maintain a topology database which specifies all interconnected nodes within the network. As a result, when it is desired to interconnect two networks, due to one enterprise taking over another enterprise, or one service provider providing services to many different networks, the desire to connect these two networks gives rise to a problem.

Currently, network nodes within a peer-to-peer network may establish connections only with other network nodes within the same network. This requirement was imposed due to the fact that a connection between network nodes from two different networks will necessitate a complete reestablishment of a topological database to specify all nodes within the combined networks. Additionally, since each logical unit within a network is required to maintain a unique identifier within that network, it is possible that two logical units in different networks may have an identical unique identifier.

In recognition of this problem current architecture systems permit limited connectivity between networks. Specifically, a network node from a first data processing network may be connected to an endpoint node with a different network identifier. This is permitted due to the fact that endpoint nodes do not maintain topological databases and it is only necessary to ensure that the endpoint node has a unique identifier for the network to which it is connected. Thus, modern peer-to-peer networks comprise multiple network nodes which may be interconnected with other network nodes only within the same network and with a plurality of endpoint nodes within any network. The limited capability of an endpoint node, having only local address capability, results in a limited amount of connectivity between two peer-to-peer networks.

In view of the above, it should be apparent that a need exits for a method of efficiently coupling multiple data processing networks together without incurring the administrative burden of maintaining a topological database for the entire merged database at each network node within the resultant merged database.

SUMMARY OF THE INVENTION

It is therefore one object of the present invention to provide an improved computer network communications system.

It is another object of the present invention to provide an improved method and apparatus for interconnecting multiple computer networks.

It is yet another object of the present invention to provide an improved method and apparatus for interconnecting multiple computer networks while maintaining topological isolation between the networks.

The foregoing objects are achieved as is now described. The method and apparatus of the present invention may be utilized to interconnect multiple data processing networks, each data processing network including: multiple network nodes having routing and functional capability within a data processing network; and, multiple endpoint nodes, each including only local address capability. Each network node may be connected to multiple endpoint nodes and other network nodes; however, connection is only permitted to network nodes within the same data processing network. A border node is established for interconnection between two data processing networks. The border node includes a network node interface having routing and functional capability within a first data processing network and an endpoint node interface having local address capability. When interconnected between the first data processing network and a network node within a second data processing network, the border node emulates a network node within the first data processing network while appearing as an endpoint node within the second data processing network, permitting full connectivity between the two networks. The border node then maintains routing information for communication between the two data processing networks in two segments. A first segment details the route between the first data processing network and the border node while a second segment details the route between the border node and a node within the second data processing network.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
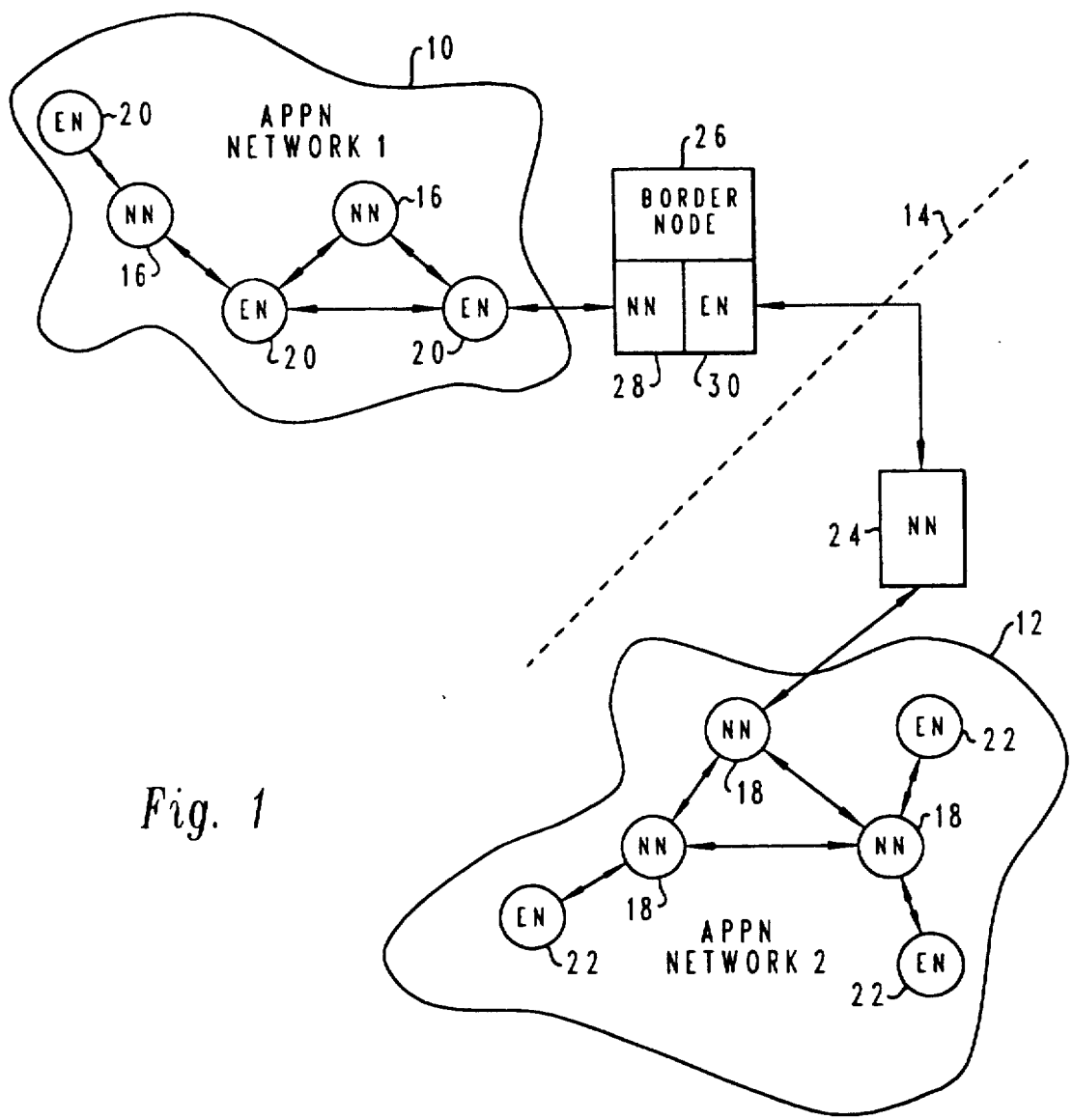
FIG. 1 depicts a pictorial representation of two data processing networks interconnected utilizing the method and apparatus of the present invention.

With reference now to the figures and in particular with reference to FIG. 1 there is depicted a pictorial representation of two data processing networks interconnected utilizing the novel method and apparatus of the present invention. As is illustrated, FIG. 1 includes two data processing networks 10 and 12. In the depicted embodiment of the present invention each data network 10 and 12 comprises an Advanced Peer-to-Peer Network (APPN) including: a plurality of network nodes having the ability to provide route selection, directory search processing and intermediate routing functions; and, a plurality of endpoint nodes having only local address capability. As illustrated, APPN network 1, as indicated at reference numeral 10, comprises multiple network nodes 16 which are interconnected to a plurality of endpoint nodes 20. As discussed above, each network node 16 is permitted to be interconnected with other network nodes within network 10.

Similarly, network 12 comprises a plurality of network nodes 18 and endpoint nodes 22. In accordance with existing protocols regarding interconnection of networks, an endpoint node within network 10 may be interconnected to a network node within network 12 across network boundary 14; however, network nodes within each network may not be interconnected with each other. This requirement is due to the fact that each network node must maintain a topology database specifying intermediate routing within that network. Additionally, unique identifiers for logical units are only unique within a selected network and the interconnection of two network nodes can result in a substantial administrative burden involving the maintenance of a much larger topology database and the possible renaming of logical units within the combined network.

Therefore, in accordance with the method and apparatus of the present invention, network 10 and network 12 may be fully interconnected by utilizing a novel border node 26 which is created for such purposes. Border node 26 may be implemented utilizing any computer or workstation of sufficient sophistication to meet the system requirements for a network node. For example, border node 26 may be implemented utilizing a midrange computer, such as the Application System/400, manufactured by International Business Machines Corporation of Armonk, N.Y.

Within border node 26 are established two separate interfaces. A network node interface 28 is established having routing and functional capability within data processing network 10. Thus, border node 26 may be interconnected within network 10, utilizing network node interface 28, in a manner similar to any other network node within data processing network 10. Additionally, border node 26 includes an endpoint node interface 30. Endpoint node interface 30 includes a local address Capability and, by emulating an endpoint node, may be connected to any network node within data processing network 12, such as network node 24.

In this manner, border node 26 will have the ability to act as a network node within data processing network 10 while appearing to be an endpoint node for purposes of interconnection with data processing network 12. By appearing to be an endpoint node for purposes of interconnection with network node 24 of data processing network 12, border node 26 meets the topology isolation requirement which is in effect for interconnection between APPN networks.

Figure 2:
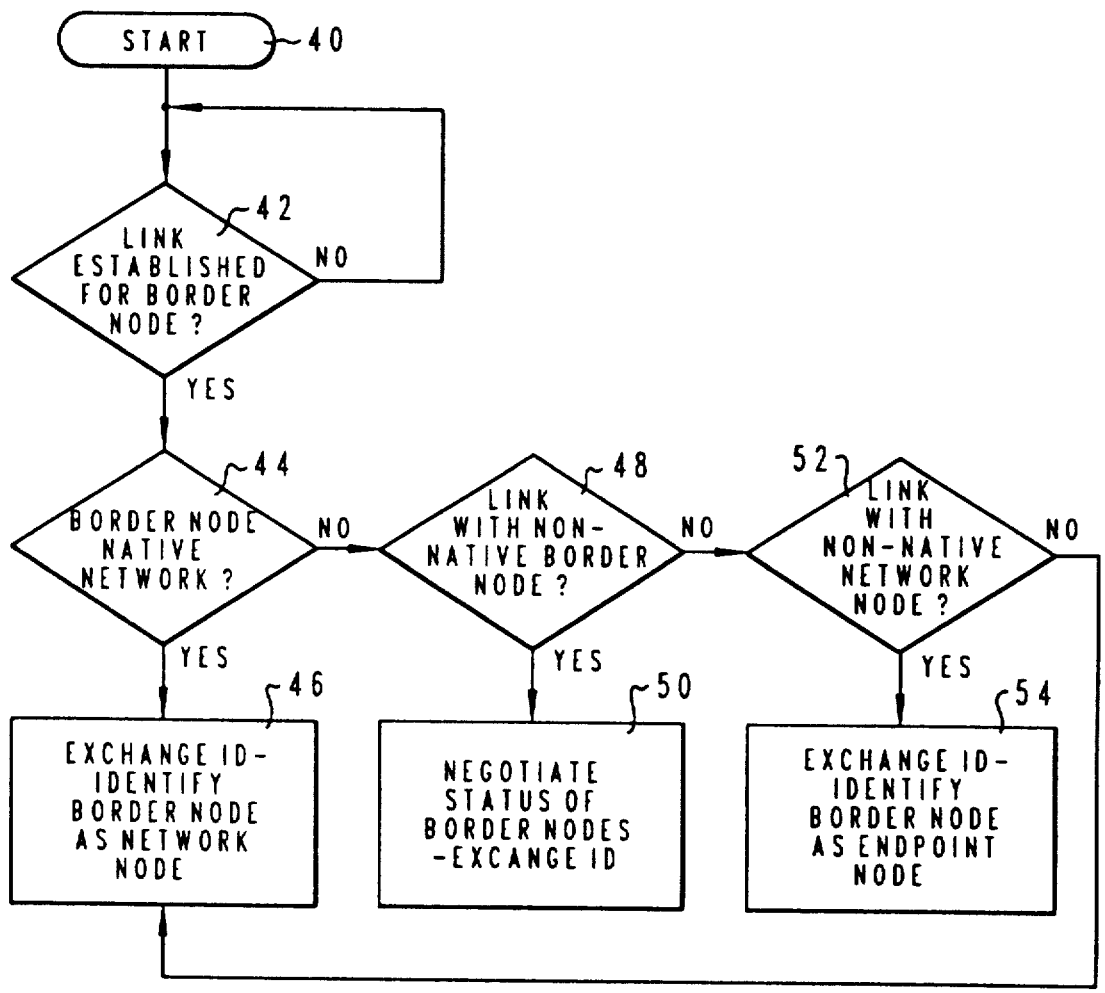
FIG. 2 is a logic flowchart illustrating the establishment of a link between two data processing networks utilizing the method and apparatus of the present invention.

Referring now to FIG. 2, there is depicted a logic flowchart illustrating the establishment of a link between two data processing networks utilizing the novel method and apparatus of the present invention. The process begins at block 40 and thereafter passes to block 42 which is utilized to illustrate a determination of whether or not a link is to be established to border node 26 (see FIG. 1). If not, the process merely iterates until such time as a link is to be established.

After determining that a link is being established for border node 26. The process passes to block 44, which depicts a determination of whether or not the link to border node 26 is being established with another node within its native network. That is, data processing network 10 of FIG. 1. If so, the process passes to block 46 and, during the initial exchange of identification, which necessarily proceeds the establishment of a link, border node 26 identifies itself within data processing network 10 as a network node. This is possible due to the fact that the network node interface within border node 26 includes all routing and functional capability necessary to operate as a network node within data processing network 10.

Referring again to block 44, in the event the link to be established with border node 26 is not a link to a node within the native network, the process passes to block 48. Block 48 illustrates a determination of whether or not the link to be established with border node 26 is a link with a non-native border node. That is, a border node associated with data processing network 12. If so, the process passes to block 50. Block 50 illustrates the negotiation of status between the two border nodes and the subsequent exchange of identification, identifying the status of each border node to the other. Those skilled in the art will appreciate that in view of the fact that a border node has the capability of emulating both a network node and an endpoint node, a form of negotiation must be utilized whenever a link is to be established between two border nodes. In the depicted embodiment of the present invention an attempted establishment of a link between two border nodes will result in the border node having the higher order network identifier establishing itself as the network node and the other border node identifying itself as an endpoint node.

Referring again to block 48, in the event the link to be established with border node 26 is not a link with a border node within data processing network 12, the process passes to block 52. Block 52 illustrates a determination of whether or not the link to be established is a link with a network node within data processing network 12. If so, the process passes to block 54, which illustrates the initial exchange of identification which will identify border node 26 as an endpoint node, utilizing endpoint node interface 30. This feature permits the maintenance of topology isolation between data processing network 10 and data processing network 12 by ensuring that border node 26 will appear as an endpoint node during an attempted link with a network node within data processing network 12.

Referring again to block 52, in the event the link to be established with data processing network 12 is a link with an endpoint node, the process passes back to block 46 which illustrates the exchanging of identification which identifies border node 26 as a network node within data processing network 10. Those skilled in the art will appreciate that existing APPN standards permit a network node from one network to interconnect with an endpoint node from another network. Thus, the situation in which border node 26 interconnects within an endpoint node from another data processing network is a trivial case for purposes of this explanation.

Figure 3:
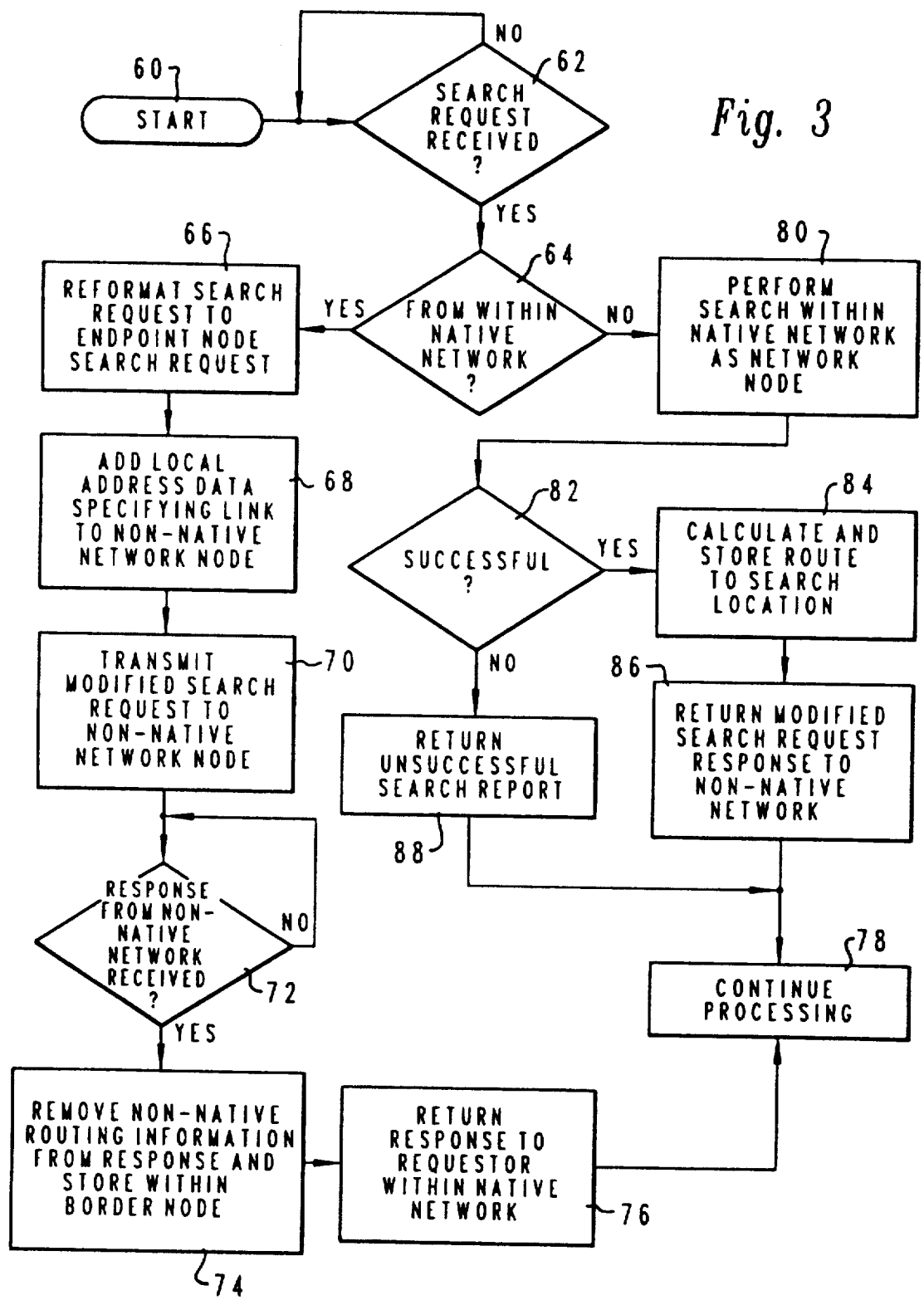
FIG. 3 a high level logic flowchart illustrating a directory search request utilizing the method and apparatus of the present invention.

With reference now to FIG. 3, there is depicted a high level logic flowchart illustrating a directory search request utilizing the method and apparatus of the present invention. As above, the process begins at block 60 and thereafter passes to block 62 which depicts a determination of whether or not a search request has been received at border node 26 (see FIG. 1). If not, the process merely iterates until such time as a directory search request has been received. After receiving a directory search request, the process passes to block 64, which depicts a determination of whether or not the directory search request was received from within the native network. That is, data processing network 10 of FIG. 1. For purposes of this explanation, it will be assumed that a search request received from within the native network will be destined for the non-native network. A search request for within the native network will be processed in a manner well known in the art. After determining that the search request is destined for the non-native network the process passes to block 66 which illustrates the reformatting of the search request to resemble an endpoint node search request, in a manner well known in the art.

After reformatting the search request to resemble an endpoint node search request block 68 depicts the adding of local address data to the search request specifying at least the link between border node 26 and the non-native network node within data processing network 12. In the depicted embodiment of FIG. 1, this link will be the link between border node 26 and network node 24.

Next, the modified search request is transmitted to the non-native network node. At this point the process passes to block 72 which illustrates the determination of whether or not a response from the non-native network has been received. If not, the process merely iterates until a response to the directory search request has been received. After receiving a response from the non-native network to the directory search request, the process passes to block 74. Block 74 illustrates the removal of non-native network routing information specifying the route to the target system within data processing network 12 and the storing of that routing information within the border node. Thereafter, the process returns the response to the requestor within the native network, as illustrated in block 76 and the process then passes to block 78 and continues processing.

Referring again to block 64, in the event the directory search request received is from the nonnative network, as determined within block 64, the process passes to block 80. Block 80 illustrates the performance of the search within the native network, with border node 26 acting as a network node within data processing network 10. Thereafter, block 82 depicts a determination of whether or not the search was successful. If so, the processes passes to block 84 which illustrates the calculation of the route to the target system within the native data processing network (data processing network 10) and the storing of that route information at border node 26. Thereafter, the process passes to block 86 which depicts the returning of the modified search request response to the non-native network.

Referring again to block 82, in the event the search within the native network was unsuccessful, block 88 illustrates the returning of an unsuccessful search report and thereafter, the unsuccessful search report is returned to the non-native network via network node 24 (see FIG. 1) and the process then passes to block 78 and continues processing.

Figure 4:
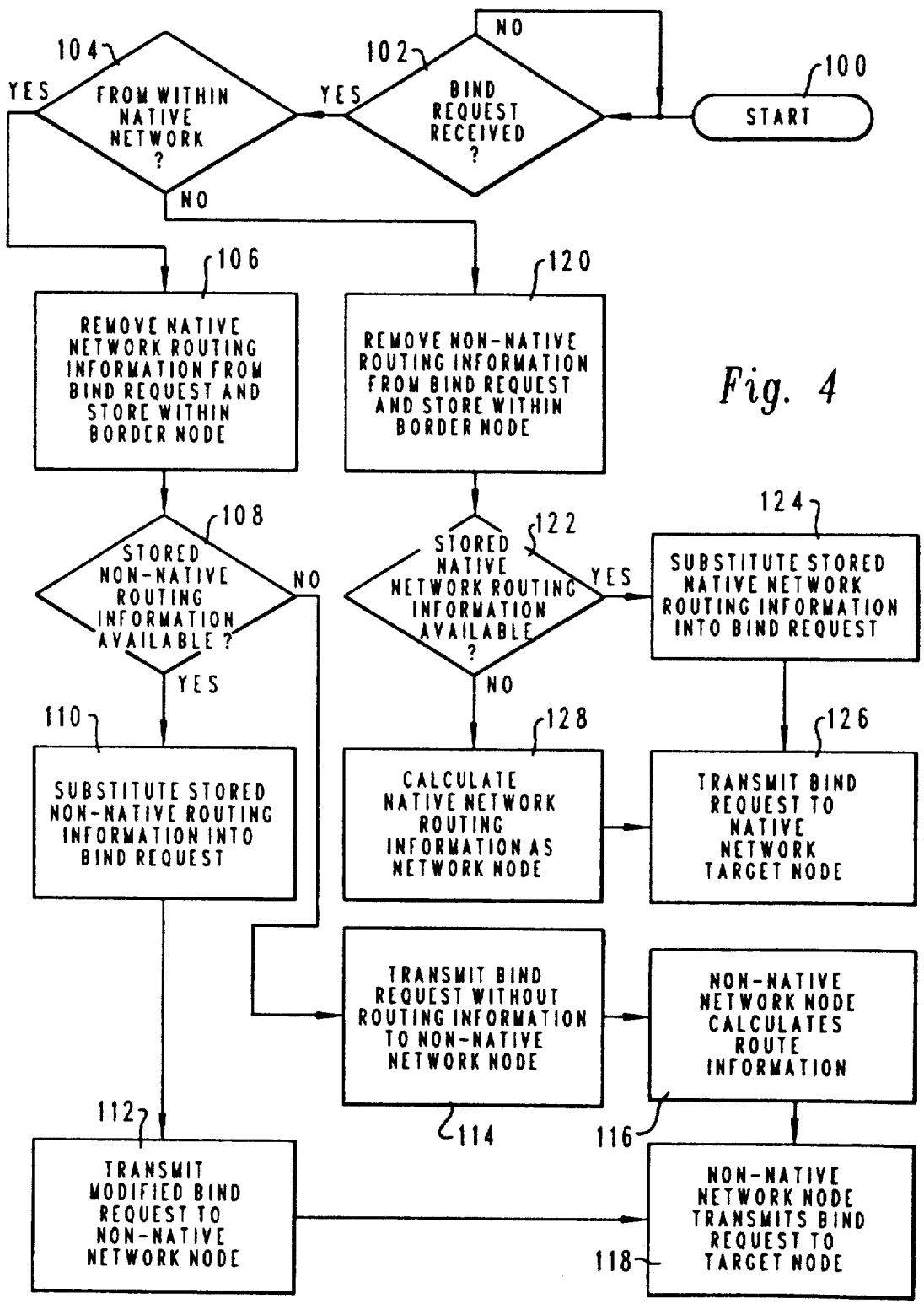
FIG. 4 is a high level logic flowchart illustrating a bind request utilizing the method and apparatus of the present invention.

Finally, referring to FIG. 4, there is depicted a high level logic flowchart illustrating a bind request utilizing the method and apparatus of the present invention. Those skilled in the art will appreciate that "bind" is a command utilized to initiate and terminate session level communications utilizing the aforementioned System Network Architecture (SNA).

As above, the process begins at block 100 and thereafter passes to block 102 which depicts a determination of whether or not a bind request to initiate a session level connection has been received. If not, the process merely iterates until such time as a bind request is received. After receiving a bind request, as depicted in block 102, the process passes to block 104. Block 104 illustrates a determination of whether or not the bind request has been received from within the native network (data processing network 10 of FIG. 1). As above, for purposes of this explanation, it will be assumed that a bind request received from within the native network will be destined for the non-native network. A bind request for within the native network will be processed in a manner well known in the art. If the bind request is received from within the native network, and is destined for the non-native network, the process passes to block 106. Block 106 illustrates the removal of the native network routing information, which determines the route from the requestor within the native data processing network to the border node, and the storage of that routing information within border node 26. Next, the process passes to block 108.

Block 108 illustrates a determination of whether or not stored non-native network routing information is available at the border node for this request and response. Referring again to FIG. 3, this non-native network routing information was removed from the response from the non-native network and stored within the border node, as depicted within block 74. However, this information may have been aged out of the border node and may not be available.

In the event the non-native network routing information is available, as depicted in block 108, the process then passes to block 110, which illustrates the substitution of the stored non-native network routing information into the bind request. Thereafter, the process passes to block 112, which depicts the transmitting of the modified bind request to the non-native network node for routing within the non-native network. The process then passes to block 118 which illustrates the non-native network node transmitting the bind request to the target node within the non-native network.

Referring again to block 108, in the event the stored non-native network routing information is no longer available, the process passes to block 114. Block 114 illustrates the transmitting of the bind request to the non-native network node without routing information. Thereafter, as illustrated in block 116, the non-native network node will calculate the necessary route information utilizing the topology database contained therein and the process will again pass to block 118, depicting the transmittal by the non-native network node of the bind request to the target node.

Referring once again to block 104, in the event the bind request received at border node 26 is not from within the native network, the process passes from block 104 to block 120. Block 120 depicts the removal of non-native network routing information from the bind request and the storing of that non-native network routing information within the border node. Thereafter, the process passes to block 122. Block 122 illustrates a determination of whether or not stored native network routing information is available for this particular request. Referring again to FIG. 3, the routing information necessary to reach a target node within the native network was calculated and stored, as depicted within block 84 of FIG. 3. However, as discussed above, this information may no longer be available, and if not, the process passes to block 128 which depicts the calculation of native network routing information by border node 26, acting in its capacity as a network node within the native network.

Referring again to block 122, in the event the native network routing information stored within the border node is still available, the process passes to block 124. Block 124 illustrates the substitution of the stored native network routing information into the bind request and thereafter, or after calculating the native network routing information necessary, as depicted in block 128, the process will pass to block 126. Block 126 depicts the transmitting of the bind request to a native network target node.

Upon reference to the foregoing, those skilled in the art will appreciate that the Applicants in the present application have created a novel border node which permits full scale interconnection between two data processing networks, but which maintains topological isolation between those two networks. By establishing a border node having both a network node interface and an endpoint node interface, and selectively emulating either a network node or an endpoint node, two data processing networks may be interconnected without requiring shared topological data between the two networks.

While the invention has been particularly shown and described with reference to a preferred embodiment, it will be understood by those skilled in the art that various changes in form and detail may be made therein without departing from the spirit and scope of the invention.

What is claimed is:

1. A method for interconnecting a plurality of data processing networks, each said data processing network including: a plurality of network nodes, each said network node having routing and functional capability within said data processing network, and, a plurality of endpoint nodes, each said endpoint node having only local address capability, each said network node being connected to another said network node only within the same data processing network and to a plurality of said endpoint nodes within any said data processing network, said method comprising the steps of:
   establishing a border node within a first one of said data processing networks;
   establishing within said border node a network node interface having routing and functional capability for said first data processing network;
   establishing within said border node an endpoint node interface having local address capability;
   linking said endpoint node interface of said border node to a selected network node within a second one of said data processing networks, identifying said border node as an endpoint node having local address capability within said second data processing network;

transmitting directory search requests from within said first data processing network to said selected node within said second data processing network; and adding local address information to each said directory search request at said border node prior to transmitting each said directory search request to said selected network node within said second data processing network, said local address information specifying at least said link between said border node and said selected network node within said second data processing network.

2. The method for interconnecting a plurality of data processing networks according to claim 1, further including the step of removing second data processing network routing information from each directory search request response received at said border node from said selected network node within said second data processing network and storing said second data processing network routing information within said border node prior to returning said directory search request response to said first data processing network.

3. The method for interconnecting a plurality of data processing networks according to claim 2, further including the step of transmitting a bind request after a successful directory search request from said first data processing network to said second data processing network via said border node and said selected network node within said second data processing network.

4. The method for interconnecting a plurality of data processing networks according to claim 3, further including the step of removing first data processing network routing information from said bind request received from said first data processing network at said border node and storing said first data processing network routing information at said border node prior to transmitting said bind request to said second data processing network.

5. The method for interconnecting a plurality of data processing networks according to claim 4, further including the step of substituting said second data processing network routing information stored at said border node into said bind request in place of said removed first data processing network routing information prior to transmitting said bind request from said border node to said selected network node within said second data processing network.

6. The method for interconnecting a plurality of data processing networks according to claim 1, further including the step of transmitting directory search requests from within said second data processing network to said first data processing network via said border node.

7. The method for interconnecting a plurality of data processing networks according to claim 6, further including the step of calculating first data processing network routing information into said first data processing network from said border node in response to a directory search request received from said selected network node within said second data processing network.

8. The method for interconnecting a plurality of data processing networks according to claim 7, further including the step of transmitting a directory search request response from said border node to said selected network node within said second data processing network after removing said calculated first data processing network routing information from said directory search request response.

9. A border node for interconnecting two data processing networks, each said data processing network including: a plurality of network nodes, each said network node having routing and functional capability within said data processing network; and, a plurality of endpoint nodes, each said endpoint node having only local address capability, each said network node being connected to another said network node only within the same data processing network and to a plurality of endpoint nodes within any said data processing network, said border node comprising:

a network node interface within said border node having routing and functional capability within a first one of said data processing networks;

an endpoint node interface within said border node having local address capability;

means for selectively linking said endpoint node interface within said border node with a selected network node within a second one of said data processing networks; and means for adding local address information to each directory search request transmitted from within the first data processing network to said selected network node within said second data processing network prior to transmitting each said directory search request to said selected network node within said second data processing network, said local address information specifying at least said link between said border node and said selected network node within said second data processing network.

* * * * *